United States Patent
Isomura et al.

(10) Patent No.: US 10,635,165 B2
(45) Date of Patent: Apr. 28, 2020

(54) PORTABLE ELECTRONIC APPARATUS, DISPLAY METHOD, DISPLAY SYSTEM, PROGRAM, AND STORAGE MEDIUM

(71) Applicant: SEIKO EPSON CORPORATION, Tokyo (JP)

(72) Inventors: Masakazu Isomura, Shiojiri (JP); Hidenori Nakamura, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/446,865

(22) Filed: Jun. 20, 2019

(65) Prior Publication Data

US 2019/0346916 A1 Nov. 14, 2019

Related U.S. Application Data

(63) Continuation of application No. 15/804,473, filed on Nov. 6, 2017, now Pat. No. 10,379,603.

(30) Foreign Application Priority Data

Nov. 8, 2016 (JP) ................................. 2016-217820

(51) Int. Cl.
*G06F 3/01* (2006.01)
*G04B 47/06* (2006.01)
(Continued)

(52) U.S. Cl.
CPC .............. *G06F 3/011* (2013.01); *G04C 3/002* (2013.01); *G04G 21/04* (2013.01); *G04B 47/06* (2013.01); *G04G 21/00* (2013.01)

(58) Field of Classification Search
CPC ........ G06F 3/011; G06F 3/014; G06F 3/0346; G04B 47/06; G04G 21/00
See application file for complete search history.

(56) References Cited

U.S. PATENT DOCUMENTS

| | | | |
|---|---|---|---|
| 10,379,603 B2 * | 8/2019 | Isomura | ................ G04C 3/002 |
| 2014/0077625 A1 | 3/2014 | Amagai | |

(Continued)

FOREIGN PATENT DOCUMENTS

| | | |
|---|---|---|
| JP | 2005-017021 A | 1/2005 |
| JP | 2007-041143 A | 2/2007 |

(Continued)

OTHER PUBLICATIONS

Oct. 22, 2018 Office Action issued in U.S. Appl. No. 15/804,473.
(Continued)

*Primary Examiner* — Stephen G Sherman
(74) *Attorney, Agent, or Firm* — Oliff PLC (57) ABSTRACT

A wrist apparatus as a portable electronic apparatus calculates an evaluation value based on data outputted from acceleration sensors, each of which serves as an inertia sensor, and assuming that when the evaluation value becomes greater than a first threshold, it is determined that a first state has been achieved, and when the evaluation value becomes smaller than a second threshold, it is determined that a second state has been achieved, performs a predetermined display when a result of the determination shows that the first state has transitioned to the second state.

15 Claims, 7 Drawing Sheets

(51) Int. Cl.
*G04G 21/00* (2010.01)
*G04C 3/00* (2006.01)
*G04G 21/04* (2013.01)

(56) References Cited

U.S. PATENT DOCUMENTS

| | | |
|---|---|---|
| 2014/0285423 A1 | 9/2014 | Sakurai |
| 2015/0120022 A1 | 4/2015 | Aoki et al. |
| 2016/0132102 A1 | 5/2016 | Nakagawa et al. |
| 2016/0306436 A1 | 10/2016 | Huang |
| 2017/0227655 A1 | 8/2017 | Kim et al. |
| 2018/0114566 A1 | 4/2018 | Aoyama et al. |

FOREIGN PATENT DOCUMENTS

| | | |
|---|---|---|
| JP | 2014-059824 A | 4/2014 |
| JP | 2014-182612 A | 9/2014 |

OTHER PUBLICATIONS

Jan. 29, 2019 Office Action issued in U.S. Appl. No. 15/804,473.
U.S. Appl. No. 15/804,473, filed Nov. 6, 2017 in the name of Isomura et al.

\* cited by examiner

PORTABLE ELECTRONIC APPARATUS, DISPLAY METHOD, DISPLAY SYSTEM, PROGRAM, AND STORAGE MEDIUM

CROSS-REFERENCE

This application is a continuation of U.S. patent application Ser. No. 15/804,473, filed Nov. 6, 2017, which claims benefit of Japanese Patent Application No. 2016-217820, filed Nov. 8, 2016, the entire contents of which are hereby incorporated by reference.

BACKGROUND

1. Technical Field

The present invention relates to a portable electronic apparatus, a display method, a display system, a program, and a storage medium.

2. Related Art

As a portable electronic apparatus of related art, there is a known wrist apparatus that is worn around a wrist or any other site with a band or any other component, detects and evaluates the state of motion of the wearer, and clocks time by using a clocking function. As a technology for such a wrist apparatus, a technology for detecting the posture of the wrist apparatus during an activity or motion, for example, for improvement in visibility of a display on the wrist apparatus has been developed in recent years.

For example, JP-A-2014-182612 describes a gesture-detection-related technology for detecting the posture of a wrist apparatus on the basis of data detected with an acceleration sensor and an angular velocity sensor and displaying an angle θ representing a difference between local coordinates and world coordinates on a display section of the wrist apparatus in a case where the angle θ is smaller than a predetermined threshold α.

Further, for example, JP-A-2014-59824 describes a technology for detecting inclination of an electronic apparatus on the basis of data outputted from a three-axis acceleration sensor even when a user is in motion in an activity, evaluating whether or not the user is viewing the electronic apparatus, and turning on a display backlight in a case where the user is viewing the electronic apparatus.

Further, for example, JP-A-2007-41143 describes a technology for detecting the posture of a wrist apparatus on the basis of data detected with a magnetic sensor (azimuth sensor) and an acceleration sensor and evaluating whether or not the posture of the wrist apparatus shows that a user is visually recognizing (viewing) the wrist apparatus.

Further, for example, JP-A-2005-17021 describes a technology for a posture detection function that allows the period for which a backlight automatically turned on illuminates and the period for which the backlight manually turned on illuminates differ from each other.

The technologies described in the patent documents described above are, however, problematic in that when the user is doing an activity, for example, when the user is jogging, and the user moves the arm to view the display section of the wrist apparatus from the arm swinging state that accompanies the activity, insufficient accuracy in detection of the arm's motion that allows the user to view the wrist apparatus does not allow the display on the display section to be switched or causes the display switching timing to deviate from proper timing in some cases.

SUMMARY

An advantage of some aspects of the invention is to solve at least a part of the problems described above, and the invention can be implemented as the following forms or application examples.

APPLICATION EXAMPLE 1

A portable electronic apparatus according to this application example calculates an evaluation value based on data outputted from an inertial sensor, and assuming that when the evaluation value becomes greater than a first threshold, it is determined that a first state has been achieved, and when the evaluation value becomes smaller than a second threshold, it is determined that a second state has been achieved, performs a predetermined display when a result of the determination shows that the first state has transitioned to the second state.

According to the portable electronic apparatus of this application example, when the evaluation value calculated based on data outputted from the inertia sensor becomes greater than the first threshold, it is determined that the first state, in which the inertia sensor outputs a large value and which represents, for example, an arm swing state in a jogging activity, has been achieved, and when the evaluation value becomes smaller than the second threshold in the first state, it is determined that the first state has transitioned to the second state, which represents a user's different action that causes the inertia sensor to output a small value, for example, the state in which the user has moved the arm to visually recognize a display. The predetermined display is then performed on the basis of the determination of the second state. That is, when the user who is doing an activity (jogging) moves the arm to view a display on the wrist apparatus, the arm's action can be detected with high accuracy.

APPLICATION EXAMPLE 2

In the portable electronic apparatus according to the application example described above, it is preferable that the second threshold is smaller than the first threshold.

According to this application example, a relatively large inertia magnitude is obtained when the first threshold is used to evaluate whether the first state has been achieved, for example, in the state in which the user swings the arms in a jogging activity, whereas a relatively small inertia magnitude is obtained when the second threshold is used to evaluate whether the second state has been achieved, for example, in the state in which the user moves the arm to visually recognize a display, whereby setting the second threshold to be smaller than the first threshold allows appropriate evaluation to be performed.

APPLICATION EXAMPLE 3

In the portable electronic apparatus according to the application example described above, it is preferable that when the second state transitions to the first state, the predetermined display is removed.

According to this application example, the predetermined display in a viewing state can be automatically switched to a display in the arm swing state at the timing when the second state transitions to the first state as the switching timing.

APPLICATION EXAMPLE 4

In the portable electronic apparatus according to the application example described above, it is preferable that when a predetermined period elapses, the predetermined display is removed.

According to this application example, the predetermined display in the viewing state can be automatically switched to a display in the arm swing state at the timing when the predetermined period has elapsed since the predetermined display was performed as the switching timing.

APPLICATION EXAMPLE 5

In the portable electronic apparatus according to the application example described above, it is preferable that, when a plurality of the evaluation values become greater than the first threshold, it is determined that the first state has been achieved.

According to this application example, it is determined that the first state has been achieved when a plurality of evaluation values become greater than the first threshold, and noise and other factors that influence the evaluation value can therefore be eliminated, whereby the determination of the first state can be made with increased accuracy.

APPLICATION EXAMPLE 6

In the portable electronic apparatus according to the application example described above, it is preferable that when the evaluation value becomes smaller than the second threshold for the first time, it is determined that the second state has been achieved.

This application example allows quick switching to the predetermined display. A situation in which the timing of switching to the predetermined display does not coincide with the user's desired visual recognition timing but delays can therefore be avoided.

APPLICATION EXAMPLE 7

In the portable electronic apparatus according to the application example described above, it is preferable that a timing when the evaluation value is calculated coincides with a timing when the data that periodically changes is maximized.

According to this application example, when the timing at which the evaluation value is calculated coincides with the timing at which the periodically changing data outputted from the inertia sensor is maximized, the evaluation value can be calculated with increased precision.

APPLICATION EXAMPLE 8

In the portable electronic apparatus according to the application example described above, it is preferable that when the first state transitions to the second state, it is determined that a viewing state has been achieved.

According to this application example, when the first state transitions to the second state, it can be determined that the viewing state, in which the user has moved the arm to visually recognize a display, has been achieved.

The viewing state used herein is a state in which the user who carries the portable electronic apparatus can visually recognize a display on the portable electronic apparatus.

APPLICATION EXAMPLE 9

In the portable electronic apparatus according to the application example described above, it is preferable that the inertia sensor includes at least any of an acceleration sensor, an angular velocity sensor, and a magnetic sensor.

According to this application example, the evaluation value can be calculated on the basis of data outputted from at least any of the acceleration sensor, the angular velocity sensor, and the magnetic sensor.

APPLICATION EXAMPLE 10

A display method according to this application example includes calculating an evaluation value based on data outputted from an inertial sensor, and assuming that when the evaluation value becomes greater than a first threshold, it is determined that a first state has been achieved, and when the evaluation value becomes smaller than a second threshold, it is determined that a second state has been achieved, performing a predetermined display when a result of the determination shows that the first state has transitioned to the second state.

According to the display method of this application example, when the evaluation value calculated based on data outputted from the inertia sensor becomes greater than the first threshold, it is determined that the first state, in which the inertia sensor outputs a large value and which represents, for example, the arm swing state in a jogging activity, has been achieved, and when the evaluation value becomes smaller than the second threshold in the first state, it is determined that the first state has transitioned to the second state, which represents the user's different action that causes the inertia sensor to output a small value, for example, the state in which the user has moved the arm to visually recognize a display. The predetermined display is then performed on the basis of the determination of the second state. That is, when the user who is doing an activity (jogging) moves the arm to view a display on the wrist apparatus, the arm's action can be detected with high accuracy, and the predetermined display can be performed.

APPLICATION EXAMPLE 11

A display system according to this application example includes an inertia sensor, a calculation section that calculates an evaluation value based on data outputted from the inertial sensor, an evaluation section that determines that a first state has been achieved when the evaluation value becomes greater than a first threshold and determines that a second state has been achieved when the evaluation value becomes smaller than a second threshold, and a display section that performs a predetermined display when a result of the determination shows that the first state has transitioned to the second state.

According to the display system of this application example, the calculation section calculates the evaluation value based on data outputted from the inertia sensor. The evaluation section determines, when the evaluation value becomes greater than the first threshold, that the first state, in which the inertia sensor outputs a large value and which represents, for example, the arm swing state in a jogging activity, has been achieved, and determines, when the evaluation value becomes smaller than the second threshold in the first state, that the first state has transitioned to the second state, which represents the user's different action that causes the inertia sensor to output a small value, for example, the state in which the user has moved the arm to visually recognize a display. The display section then performs the predetermined display on the basis of the determination of the second state. That is, when the user who is doing an activity (jogging) moves the arm to view the display section of the wrist apparatus, the arm's action can be detected with high accuracy, and the predetermined display can be performed.

APPLICATION EXAMPLE 12

In the display system according to the application example described above, it is preferable that the second threshold is smaller than the first threshold.

According to this application example, a relatively large inertia magnitude is obtained when the first threshold is used to evaluate whether the first state has been achieved, for example, in the state in which the user swings the arms in a jogging activity, whereas a relatively small inertia magnitude is obtained when the second threshold is used to evaluate whether the second state has been achieved, for example, in the state in which the user moves the arm to visually recognize a display, whereby setting the second threshold to be smaller than the first threshold allows appropriate evaluation to be performed.

APPLICATION EXAMPLE 13

In the display system according to the application example described above, it is preferable that when the second state transitions to the first state, the predetermined display is removed.

According to this application example, the predetermined display in the viewing state can be automatically switched to the display in the arm swing state at the timing when the second state transitions to the first state as the switching timing.

APPLICATION EXAMPLE 14

In the display system according to the application example described above, it is preferable that when a predetermined period elapses, the predetermined display is removed.

According to this application example, the predetermined display in the viewing state can be automatically switched to the display in the arm swing state at the timing when the predetermined period has elapsed since the predetermined display was performed as the switching timing.

APPLICATION EXAMPLE 15

In the display system according to the application example described above, it is preferable that when the evaluation value becomes smaller than the second threshold for the first time, it is determined that the second state has been achieved.

This application example allows quick switching to the predetermined display. A situation in which the timing of switching to the predetermined display does not coincide with the user's desired visual recognition timing but delays can therefore be avoided.

APPLICATION EXAMPLE 16

A program according to this application example includes calculating an evaluation value based on data outputted from an inertial sensor, and assuming that when the evaluation value becomes greater than a first threshold, it is determined that a first state has been achieved, and when the evaluation value becomes smaller than a second threshold, it is determined that a second state has been achieved, performing a predetermined display when a result of the determination shows that the first state has transitioned to the second state.

According to the program of this application example, when the evaluation value calculated based on data outputted from the inertia sensor becomes greater than the first threshold, it is determined that the first state, in which the inertia sensor outputs a large value and which represents, for example, the arm swing state in a jogging activity, has been achieved, and when the evaluation value becomes smaller than the second threshold in the first state, it is determined that the first state has transitioned to the second state, which represents the user's different action that causes the inertia sensor to output a small value, for example, the state in which the user has moved the arm to visually recognize a display. The predetermined display is then performed on the basis of the determination of the second state. Therefore, when the user who is doing an activity (jogging) moves the arm to view the display section of the wrist apparatus, the arm's action can be detected with high accuracy, and the predetermined display can be performed.

APPLICATION EXAMPLE 17

A storage medium according to this application example that stores a program that causes a computer to execute calculating an evaluation value based on data outputted from an inertial sensor, and assuming that when the evaluation value becomes greater than a first threshold, it is determined that a first state has been achieved, and when the evaluation value becomes smaller than a second threshold, it is determined that a second state has been achieved, performing a predetermined display when a result of the determination shows that the first state has transitioned to the second state.

Using the storage medium of this application example allows a computer to execute calculating the evaluation value based on the outputted data, determining that a first state has been achieved when the evaluation value becomes greater than a first threshold and determining that a second state has been achieved when the evaluation value becomes smaller than a second threshold, and performing a predetermined display when a result of the determination shows that the second state has been achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention will be described below. It is not intended that the embodiment described below unduly limits the contents of the invention set forth in the appended claims. Further, all configurations described in the present embodiment are not necessarily essential configuration requirements of the invention.

In the present specification, a wrist apparatus will be described as an example of a portable electronic apparatus according to an embodiment of the invention. In the following sections, the description will be made in some cases on the assumption that the side facing a windshield of the wrist apparatus represents the front (front side) and the side opposite the windshield (side that is in contact with user when user wears wrist apparatus) is the rear (rear side) for convenience of the description. The wrist apparatus according to the present embodiment can be a wide variety of wristable watches, for example, a runner's watch, a multi-sport-supporting runner's watch, such as watches for duathlon and triathlon, and a GPS watch that incorporates a GPS device as a satellite positioning system.

1. Wrist Apparatus as Portable Electronic Apparatus

Figure 1:
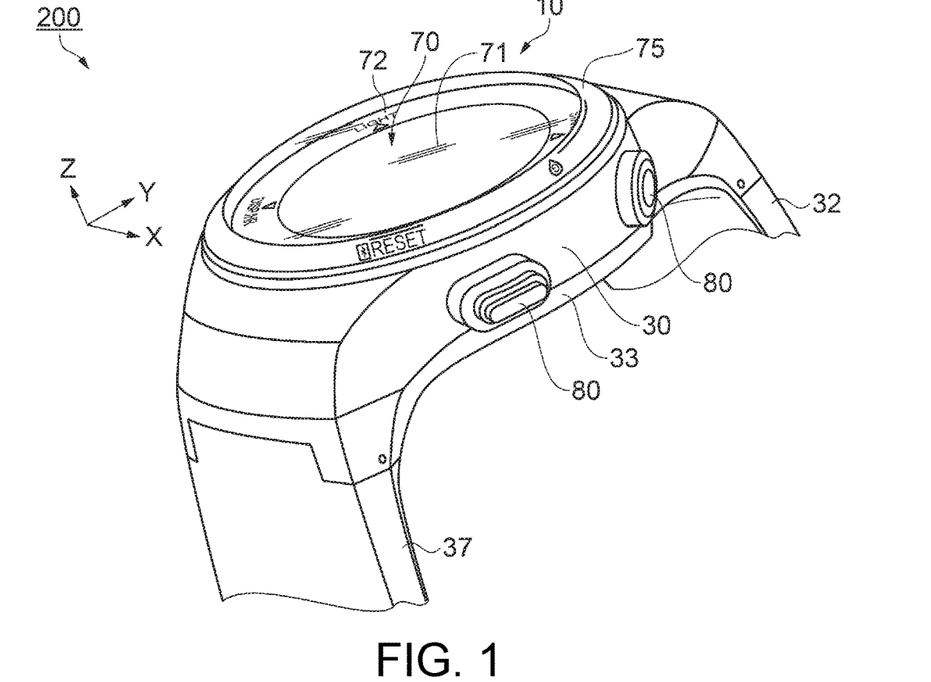
FIG. 1 is a front-side perspective view of a wrist apparatus as a portable electronic apparatus.
Figure 2:
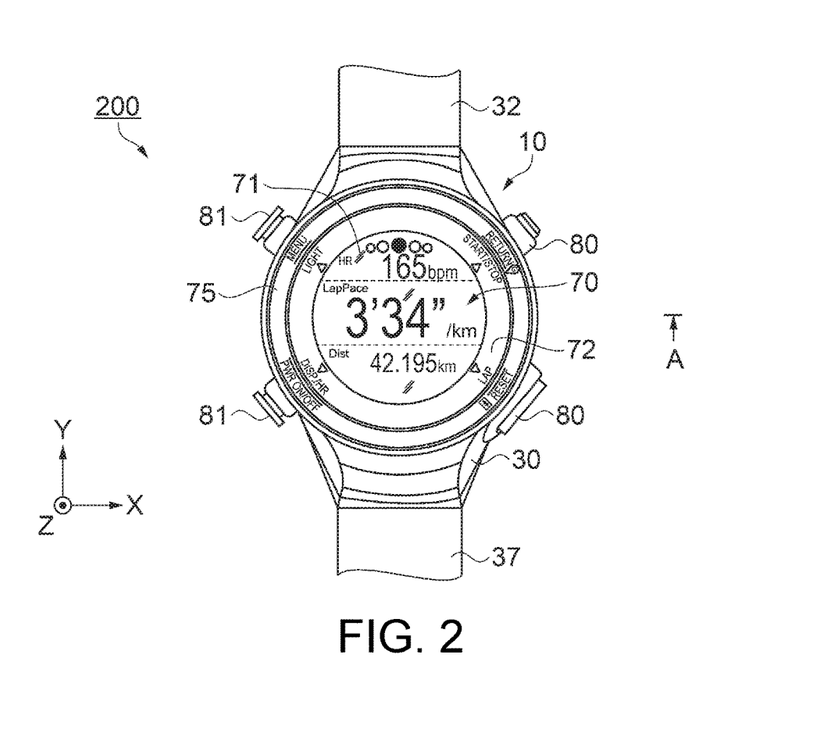
FIG. 2 is a front-side plan view of the wrist apparatus.

An overview of the wrist apparatus as the portable electronic apparatus according to the embodiment of the invention will first be described with reference to FIGS. 1 and 2. FIG. 1 is a front-side perspective view of the wrist apparatus as the portable electronic apparatus. FIG. 2 is a front-side plan view of the wrist apparatus. In FIGS. 1 and 2, the description will be made by using X, Y, and Z axes as three axes perpendicular to one another for ease of description, with the Z axis being the axis perpendicular to the surface of a windshield 71, which will be described later, and the Y axis corresponding to the direction in which a pair of band sections (first band section 32 and second band section 37 shown in FIG. 1) so disposed as to sandwich a case are arranged. Further, in the following sections, an "axial direction" means the "direction along an axis."

As shown in FIGS. 1 and 2, a wrist apparatus 200 as an example of the portable electronic apparatus (wearable electronic apparatus) is worn on a user's (wearer's) given site (wrist, for example) and capable of detecting information on the user's position, information on the user's motion, and other pieces of information. The wrist apparatus 200 includes an apparatus body 10, which is worn on the user and detects position information, motion information, and other pieces of information, and a first band section 32 and second band section 37, which are attached to the apparatus body 10 and allow the user to wear the apparatus body 10. The wrist apparatus 200 can also be equipped, for example, with the function of detecting biological information, such as pulse wave information, and the function of acquiring time information and other pieces of information as well as the function of acquiring information on the user's position and motion.

The apparatus body 10 is so configured that a bottom case 33 is disposed as a case on the side where the wrist apparatus 200 is worn on the user and a top case 30 is disposed as a case that opens frontward on the side opposite the side where the wrist apparatus 200 is worn on the user. The bottom case 33 and the top case 30 form a case. A bezel 75 is provided outside the opening, which is located on the front side of the apparatus body 10 (top case 30), and a windshield (glass plate in the present example) 71, which serves as a top plate portion (outer wall) that protects the internal structure of the apparatus body 10, is so provided inside the bezel 75 as to line up with the bezel 75. The windshield 71 is a transparent substrate and so disposed as to close the opening of the top case 30. A plurality of buttons 80 and 81 are provided on the side surface of the front side (top case 30) of the apparatus body 10. The bezel 75 can be provided with displays visually recognizable from the front side.

The apparatus body 10 further includes a display section 70, which is disposed immediately below the windshield 71 and formed, for example, of a liquid crystal display (LCD), and a parting plate 72 as a ring member, which is disposed between an outer edge portion of the windshield 71 and the display section 70. The parting plate 72 can be provided with displays visually recognizable from the front side. The apparatus body 10 may be so configured that the user can read the displays on the display section 70 and the displays on the parting plate 72 via the windshield 71. That is, in the wrist apparatus 200 according to the present embodiment, detected position information, motion information, time information, and a variety of other pieces of information may be displayed in the display section 70, and the displays may be presented to the user who faces the front side of the apparatus body 10. Further, a pair of band attaching portions (not shown) that are portions to which the first band section 32 and the second band section 37 are connected are provided on opposite sides of the bottom case 33.

The windshield 71 as the top plate portion of the apparatus body 10 is not limited to a glass plate and can be a member made, for example, of a transparent plastic material other than a glass material as long as the member is a transparent member that allows the user to read the display section 70 and has strength large enough to protect the liquid crystal display (LCD) and other constituent members that form the display section 70 accommodated in the interior formed by the top case 30 and the bottom case 33 (internal space).

2. Display System (Functional Configuration of Wrist Apparatus)

Figure 3:
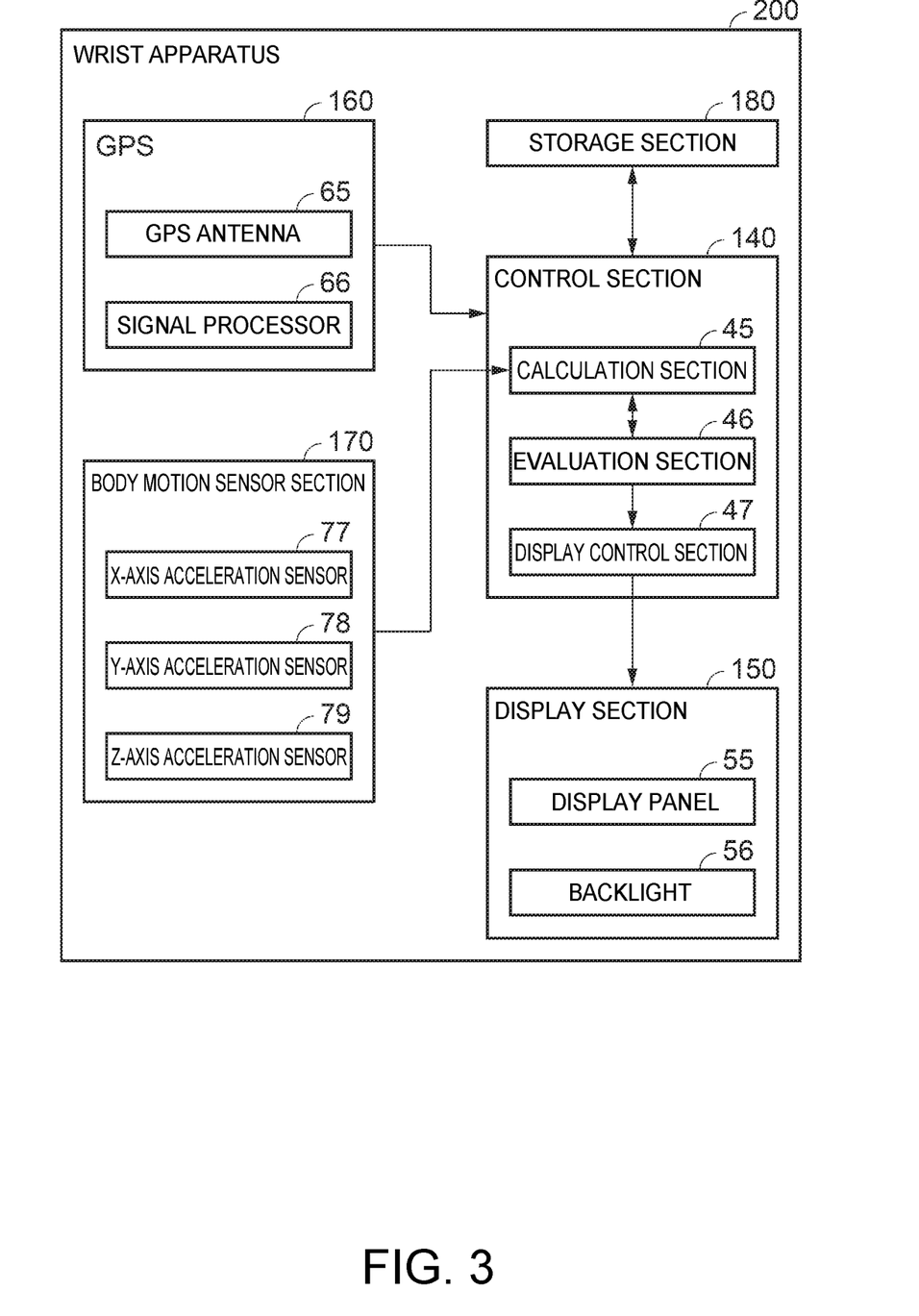
FIG. 3 is a functional block diagram showing a schematic configuration of the wrist apparatus.
Figure 4:
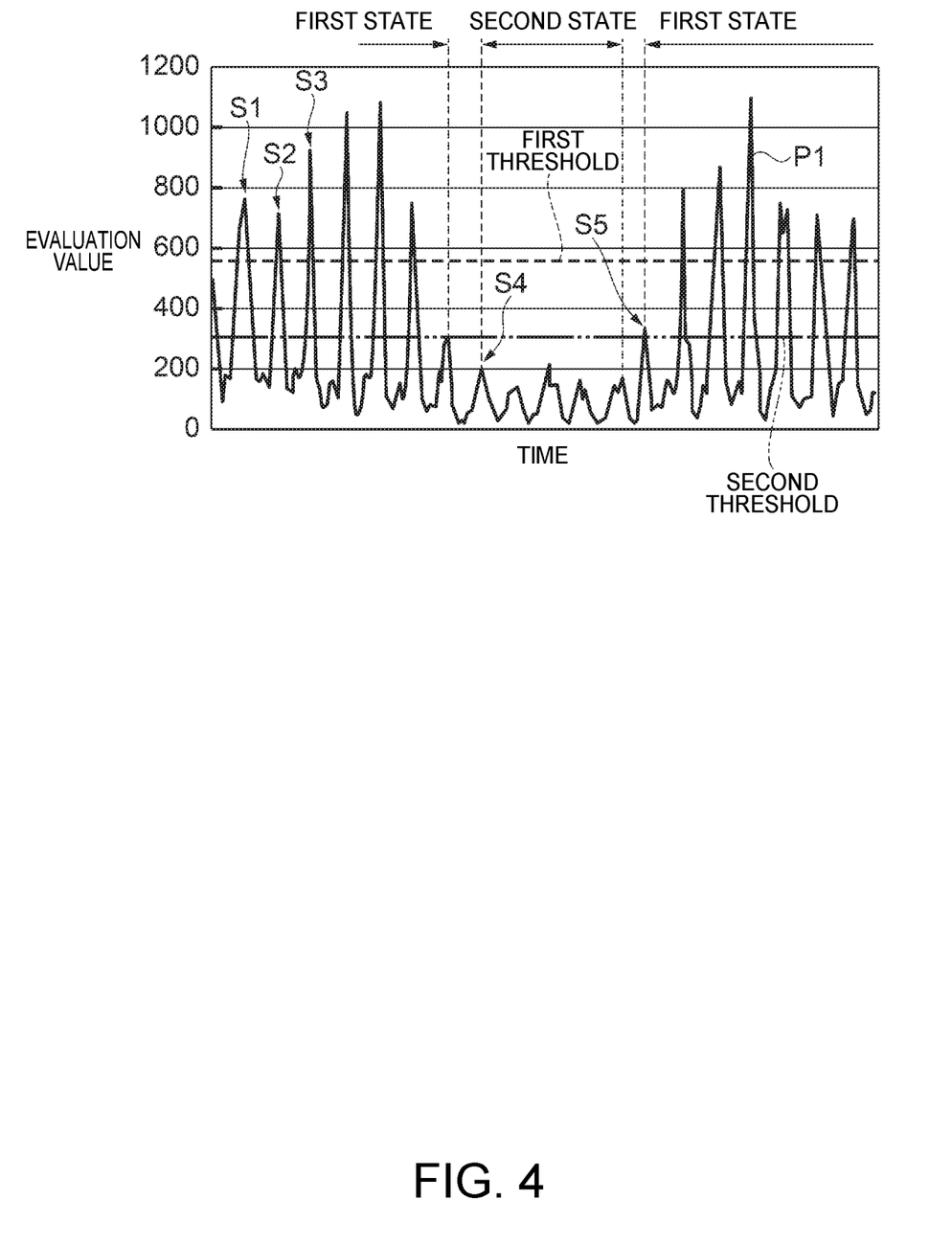
FIG. 4 is a graph for describing determination of a first state and a second state.

An example of the functional configuration of the wrist apparatus 200, which forms a display system, will next be described with reference to FIGS. 3 and 4. FIG. 3 is a functional block diagram showing a schematic configuration of the wrist apparatus. FIG. 4 is a graph for describing determination of a first state and a second state.

The wrist apparatus 200, which forms the display system, includes as the configuration of the functions of the wrist apparatus 200, a control section 140, a display section 150, a GPS 160, body motion sensor section 170, which includes acceleration sensors 77, 78, and 79, each of which serves as an inertia sensor, and a storage section 180, as shown in FIG. 3. It is, however, noted that the wrist apparatus 200 does not necessarily have the configuration shown in FIG. 3, and part of the components in the configuration can be omitted, another component can be added to the configuration, and a variety of other variations are conceivable.

The control section 140 performs a variety of types of signal processing and control processing, for example, by using the storage section 180 as a work area and can be achieved, for example, by a processor, such as a CPU, or a logic circuit, such as an ASIC. The control section 140 includes at least a calculation section 45, an evaluation section 46, and a display control section 47. The control section 140 further forms a circuit that drives the display section 150 (display panel 55), a circuit that controls the GPS 160, a circuit that drives the body motion sensor section 170 and detects body motion information, such as inertia data, and other control circuits.

The calculation section 45 uses outputs representing acceleration along the three axes, the X, Y, and Z axes, and detected with the acceleration sensors 77, 78, and 79, each of which serves as an inertia sensor, to calculate an evaluation value. The evaluation value is calculated in the form of a combined power P1, which is the combination of the outputs representing acceleration along the three axes, the X, Y, and Z axes, and detected with the acceleration sensors 77, 78, and 79.

For example, let Ax be the output value (magnitude of acceleration) detected with the acceleration sensor 77, which detects the acceleration in the X-axis direction, Ay be the output value (magnitude of acceleration) detected with the acceleration sensor 78, which detects the acceleration in the Y-axis direction, and Az be the output value (magnitude of acceleration) detected with the acceleration sensor 79, which detects the acceleration in the Z-axis direction, and the three-axis combined power P1 can be determined, for example, by the following Expression (1).

$$P1 = Ax^2 + Ay^2 + Az^2 \quad (1)$$

To calculate the combined power P1, three-axis output values at a timing when periodically changing acceleration data outputted from the acceleration sensors 77, 78, and 79 are maximized are combined with one another to determine the combined power P1. The combined power P1 is used as the evaluation value. When the timing at which the combined power P1 is calculated as the evaluation value coincides with the timing at which the periodically changing output values from the acceleration sensors 77, 78, and 79 are maximized, the evaluation value (combined power P1) can be calculated with increased precision.

The evaluation section 46 determines that a first state has been achieved when the evaluation value (combined power P1) becomes greater than a first threshold and determines that a second state has been achieved when the evaluation value (combined power P1) becomes smaller than a second threshold. The first and second thresholds are each set at a predetermined value in advance. The second threshold is set to be smaller than the first threshold. When the second threshold is set to be smaller than the first threshold, a relatively large inertia magnitude is obtained when the evaluation section 46 uses the first threshold to evaluate whether the first state has been achieved, for example, in a state in which the user swings the arms in a jogging activity, whereas a relatively small inertia magnitude is obtained when the evaluation section 46 uses the second threshold to evaluate whether the second state has been achieved, for example, in a state in which the user moves the arm to visually recognize a display, whereby setting the second threshold to be smaller than the first threshold allows appropriate evaluation to be performed.

When the first state, in which the evaluation value is greater than the first threshold, transitions to the second state, in which the evaluation value is smaller than the second threshold, the evaluation section 46 determines that a viewing state has been achieved. The viewing state is a state in which the user who carries the wrist apparatus 200 moves the wrist apparatus 200 to a position where a display thereon is visually recognizable.

In a case where the user is running or performing any other activity, the user's motion is intense, for example, the user is swinging the arms, and the magnitudes of the output data on the three-axis acceleration outputted from the acceleration sensors 77, 78, and 79 therefore increase, resulting in a large evaluation value (combined power P1). In a case where the user is running or performing any other activity and the user desires to visually recognize a display on the wrist apparatus 200, the user reduces the amplitude of the arm swinging motion, rotates the arm to the position where the display is viewable, and eventually visually recognizes the display in a state in which the arm swing motion is almost brought to a halt. Since the magnitudes of the output data on the three-axis acceleration outputted from the acceleration sensors 77, 78, and 79 therefore decrease, the evaluation value (combined power P1) decreases accordingly. When the evaluation value (combined power P1) transitions to the second state, in which the evaluation value is smaller than the second threshold, which is smaller than the first threshold, it can be determined that the viewing state, in which the user has moved the arm to visually recognize the display, has been achieved.

The evaluation section 46 preferably determines that the first state has been achieved when a plurality of evaluation values (each of which is combined power P1), for example, evaluation values S1, S2, and S3 shown in FIG. 4, become greater than the first threshold. It is determined that the first state has been achieved when the plurality of evaluation values S1, S2, and S3 become greater than the first threshold, and noise and other factors that influence the evaluation value can therefore be eliminated, whereby the determination of the first state can be made with increased accuracy.

The evaluation section 46 preferably determines that the second state has been achieved when the evaluation value (combined power P1), for example, an evaluation value S4 shown in FIG. 4, becomes smaller than the second threshold for the first time. The determination described above allows quick switching to the predetermined display with no time lag. A situation in which the timing of switching to the predetermined display does not coincide with the user's desired visual recognition timing but delays can therefore be avoided.

The display control section 47 controls, for example, generation of data to be displayed, for example, user's position information, user's activity information, and clocking information, and display instruction to be issued to the display section 150. When the evaluation section 46 determines that the second state has been achieved, the display control section 47 instructs the display section 150 to perform a predetermined display. In the present embodiment, the predetermined display is the action of turning on a backlight 56, which is provided in the display section 150. Turning on the backlight 56 allows improvement in visibility of a display displayed on the display panel 55 of the display section 150, whereby the display can be visually recognized even during motion in an activity, for example, a running activity.

Further, when the evaluation section 46 determines that the second state has transitioned to the first state, the display control section 47 instructs the display section 150 to remove the predetermined display. The predetermined display can thus be removed and automatically switched to a display in the arm swing state during running (normal state) at the timing when the second state transitions to the first state as a switching timing. The removal of the predetermined display in the present embodiment is the action of turning off the backlight 56. Since the display is automatically switched, a state in which a large amount of current is consumed, for example, the state in which the backlight 56 illuminates, is allowed to last for a short period, whereby consumption of a secondary battery or any other power supply can be reduced.

The display control section 47 can issue an instruction of removable of the predetermined display at the timing when the evaluation section 46 determines that the first state has transitioned to the second state, that is, when a predetermined period set in advance has elapsed since the predetermined display started, in other words, at the timing when the evaluation section 46 determines that the predetermined period set in advance has elapsed. As a result, the predetermined display can be removed and automatically switched to the normal display on the basis of the timing when the period having elapsed since the timing when the first state transitioned to the second state reaches the predetermined period set in advance. Since the display is automatically switched, a state in which a large amount of current is consumed, for example, the state in which the backlight 56 illuminates, is allowed to last for a short period, whereby consumption of the secondary battery or any other power supply can be reduced.

The display section 150 includes the display panel 55, which is formed, for example, of a liquid crystal display (LCD), and the backlight 56 and can display a variety of pieces of information on the basis of a display instruction from the display control section 47.

The GPS 160 includes a GPS antenna 65 and a signal processor 66, and the signal processor 66 can perform positioning calculation on the basis of a plurality of satellite signals received via the GPS antenna 65 to acquire the user's position information.

The body motion sensor section 170 can detect information on the user's body motion, that is, the body motion information. The body motion sensor section 170 includes the acceleration sensors 77, 78, and 79, each of which serves as an inertia sensor. The acceleration sensors 77, 78, and 79 measure acceleration along the X, Y, and Z axes, which are three axes perpendicular to one another, as described above. Specifically, the acceleration sensor 77 detects acceleration in the X-axis direction, the acceleration sensor 78 detects acceleration in the Y-axis direction, and the acceleration sensor 79 detects acceleration in the Z-axis direction.

As the inertia sensor, at least any of an acceleration sensor, an angular velocity sensor, and a magnetic sensor can be used. Use of such a sensor allows the calculation of the evaluation value.

The magnetic sensor can be used as a sensor that senses the magnitude and direction of the magnetic field around the wrist apparatus 200. That is, the magnetic sensor detects the magnitudes of the components of the magnetic field in the directions of the three axes perpendicular to each other and output the detected magnitudes as magnetism data. The magnetic sensor can sense magnetism in a plurality of axial directions, for example, in the directions of the three axes (X, Y, and Z). The magnetic field sensed with the magnetic sensor includes a surrounding magnetic field produced by the geomagnetism at the location where the magnetic sensor is present and a magnet, a magnetic body, or any other object present in the vicinity of the magnetic sensor. The magnetism data is, for example, used when the control section 140 calculates the azimuth with respect to the wrist apparatus 200.

The storage section 180 stores the acceleration data from the body motion sensor section 170 and the user's current position information, the user's movement information, and other pieces of information from the GPS 160 under the control of the control section 140. The storage section 180 further stores a program that causes a computer to execute a series of processes relating to the display system according to the present embodiment. A memory can be formed, for example, of an SRAM (static random access memory), a DRAM (dynamic random access memory), or any other semiconductor memory or a register. For example, the memory stores computer readable instructions, and when the processor executes the instructions, the function of each portion of the display system involving the wrist apparatus 200 can be achieved. The instructions may be instructions that form the program or may be instructions that instruct a hardware circuit in the processor to operate.

A process carried out by each portion of the wrist apparatus 200 according to the present embodiment can be achieved by a program. That is, the approach according to the present embodiment is applicable to a program that causes a computer to execute the process of calculating the evaluation value on the basis of data outputted from the acceleration sensors 77, 78, and 79, each of which serves as an inertia sensor, assuming that it is determined that the first state has been achieved when the evaluation value becomes greater than the first threshold, and that it is determined that the second state has been achieved when the evaluation value becomes smaller than the second threshold, and causing the display section 150 to perform the predetermined display when a result of the determination shows that the first state has transitioned to the second state.

The approach according to the present embodiment is also applicable to a program that causes a computer to execute the process of calculating the evaluation value on the basis of data outputted from the acceleration sensors 77, 78, and 79, each of which serves as an inertia sensor, assuming that it is determined that the first state has been achieved when the evaluation value becomes greater than the first threshold, and that it is determined that the second state has been achieved when the evaluation value becomes smaller than the second threshold, causing the display section 150 to perform the predetermined display when a result of the determination shows that the first state has transitioned to the second state, and automatically switching the predetermined display in the viewing state to the normal display in the arm swing state by using the timing when the first state transitions to the second state as the switching timing or using the timing when the period having elapsed since the timing when the first state transitioned to the second state reaches the predetermined period set in advance as the switching timing.

A storage medium that stores the program that causes a computer to execute the series of processes relating to the display system according to the present embodiment may not only be the memory and register provided in the storage section 180 but, for example, a hard disk drive or any other magnetic storage device or an optical disk device or any other optical storage device as an external storage medium that can communicate with the wrist apparatus 200.

According to the wrist apparatus 200 described above as the portable electronic apparatus, when the evaluation value calculated on the basis of data outputted from the acceleration sensors 77, 78, and 79, each of which serves as an inertia sensor and which detect acceleration along the three axes, becomes greater than the first threshold, it is determined that the first state, in which the inertia sensors output large values and which represents, for example, an arm swing state in a jogging activity, has been achieved, and when the evaluation value becomes smaller than the second threshold in the first state, it is determined that the first state has transitioned to the second state, which represents the user's different action that causes the acceleration sensors 77, 78, and 79 to output small values, for example, the state in which the user has moved the arm to visually recognize a display. To perform the predetermined display on the basis of the determination of the second state, when the user who is doing an activity (jogging) moves the arm to view the display section 150 of the wrist apparatus 200, the arm's action can be detected with high accuracy.

3. Display Method (Procedure of Actions of Display System)

Figure 5:
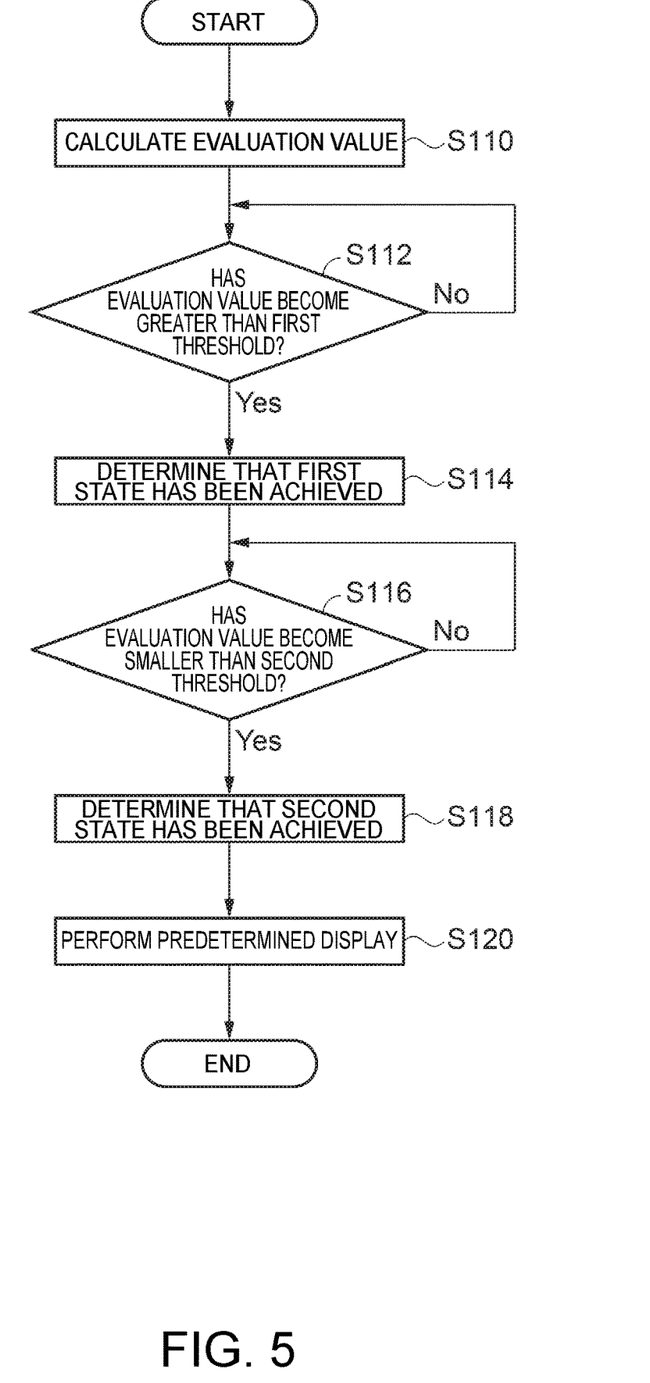
FIG. 5 is a flowchart showing Example of a display method using the wrist apparatus.

Example of the display system using the wrist apparatus 200 and the procedure of actions of the display system (display method) will next be described as the procedure of actions of the display system with reference to FIG. 5. FIG. 5 is a flowchart showing Example of a display method using the wrist apparatus. The description will be made by assigning the same reference characters to the same configurations as the configurations and forms of the wrist apparatus 200 described above.

3.1. Procedure of Actions of Display System According to Example (Display Method)

Example of the display method using the display system includes step S110 of calculating the evaluation value, assuming that in the case where a result of evaluation of whether or not the evaluation value has become greater than the first threshold (step S112) shows that the evaluation value has become greater than the first threshold, it is determined that the first state has been achieved (step S114), and that in the case where a result of evaluation of whether or not the evaluation value has become smaller than the second threshold (step S116) shows that the evaluation value has become smaller than the second threshold, it is determined that the second state has been achieved (step S118), and step S120 of performing the predetermined display when a result of the evaluation shows that the first state has transitioned to the second state, as shown in FIG. 5.

The procedure of the actions will be described below on a step basis in accordance with the flowchart of FIG. 5. It is noted that the first and second thresholds are each set at a predetermined value in advance. The second threshold is set to be smaller than the first threshold. When the second threshold is set to be smaller than the first threshold, a relatively large inertia magnitude is obtained when the first threshold is used to evaluate whether the first state has been achieved, for example, in the state in which the user swings the arms in a jogging activity, whereas a relatively small inertia magnitude is obtained when the second threshold is used to evaluate whether the second state has been achieved, for example, in the state in which the user moves the arm to visually recognize a display, whereby setting the second threshold to be smaller than the first threshold allows appropriate evaluation to be performed.

The wrist apparatus 200 first calculates the evaluation value on the basis of the acceleration data outputted from the acceleration sensors 77, 78, and 79, each of which serves as an inertia sensor (step S110). The calculation of the evaluation value is performed by the calculation section 45, which is part of the control section 140. The evaluation value is calculated on the basis of output data on the acceleration along the three axes, the X, Y, and Z axes, detected by the acceleration sensors 77, 78, and 79, each of which serves as an inertia sensor.

Specifically, let Ax be the output value (magnitude of acceleration) detected with the acceleration sensor 77, which detects the acceleration in the X-axis direction, Ay be the output value (magnitude of acceleration) detected with the acceleration sensor 78, which detects the acceleration in the Y-axis direction, and Az be the output value (magnitude of acceleration) detected with the acceleration sensor 79, which detects the acceleration in the Z-axis direction, and the three-axis combined power P1 or the evaluation value can be determined, for example, by the following Expression (1).

$$P1 = Ax^2 + Ay^2 + Az^2 \qquad (1)$$

In this process, three-axis output values at a timing when periodically changing acceleration data outputted from the acceleration sensors 77, 78, and 79 are maximized are combined with one another to determine the combined power P1. The combined power P1 is used as the evaluation value.

The evaluation section 46 then evaluates whether or not the calculated evaluation value (combined power) has become greater than the first threshold (step S112). The evaluation section 46 determines that the first state has been achieved (step S114) when the evaluation value (combined power P1) becomes greater than the first threshold in step S112 (Yes in step S112). In a case where the evaluation value has not become greater than the first threshold (No in step S112), the evaluation section 46 repeats the evaluation in step S112.

The evaluation section 46 preferably determines in step S112 that the first state has been achieved when a plurality of evaluation values (each of which is combined power P1), for example, evaluation values S1, S2, and S3 shown in FIG. 4, become greater than the first threshold. When it is determined that the first state has been achieved when the plurality of evaluation values S1, S2, and S3 become greater than the first threshold, noise and other factors that influence the evaluation value can be eliminated, whereby the determination of the first state can be made with increased accuracy.

The evaluation section 46 then evaluates whether or not the evaluation value has become smaller than the second threshold in the first state determined in step S114 (step S116). The evaluation section 46 determines that the second state has been achieved (step S118) when the evaluation value (combined power P1) becomes smaller than the second threshold in step S116 (Yes in step S116). In a case where the evaluation value has not become smaller than the second threshold (No in step S116), the evaluation section 46 repeats the evaluation in step S116.

The evaluation section 46 preferably determines in step S116 that the second state has been achieved when the evaluation value (combined power P1), for example, an evaluation value S4 shown in FIG. 4, becomes smaller than the second threshold for the first time. The above determination of the second state allows quick switching to a predetermined display with no time lag. A situation in which the timing of switching to a predetermined display does not coincide with the user's desired visual recognition timing but delays can therefore be avoided.

In the case where the evaluation section 46 determines in step S114 described above that the first state has been achieved and determines in step S118 that the second state has been achieved, the determination means that the first state has transitioned to the second state, and the display control section 47 instructs the display section 150 to perform the predetermined display, for example, the display control section 47 instructs the display section 150 to turn on the backlight 56 provided in the display section 150. In response to the instruction, the display section 150 switches the display on the display panel 55 from the normal display, which is display in the arm swing state, for example, in a jogging activity, to the predetermined display (step S120).

Performing the predetermined display allows further improvement in the visibility of the display displayed on the display panel 55 of the display section 150, whereby the display can be visually recognized even during motion in an activity, for example, a running activity.

The predetermined display in step S120 is the end of the procedure of the series of action (display method) of the display system according Example using the wrist apparatus 200 and the procedure of the actions of the display system (display method).

According to the display system of the Example using the wrist apparatus 200 and the procedure of the actions of the display system (display method) described above, when the evaluation value calculated on the basis of data outputted from the acceleration sensors 77, 78, and 79, each of which serves as an inertia sensor and which detect acceleration along the three axes, becomes greater than the first threshold, it is determined that the first state, in which the inertia sensors output large values and which represents, for example, an arm swing state in a jogging activity, has been achieved, and when the evaluation value becomes smaller than the second threshold in the first state, it is determined that the first state has transitioned to the second state, which represents the user's different action that causes the acceleration sensors 77, 78, and 79 to output small values, for example, the state in which the user has moved the arm to visually recognize a display. To perform the predetermined display on the basis of the determination of the second state, when the user who is doing an activity (jogging) moves the arm to view the display section 150 of the wrist apparatus 200, the arm's action can be detected with high accuracy.

4. Variations of Display Method (Procedure of Actions of Display System)

Figure 6:
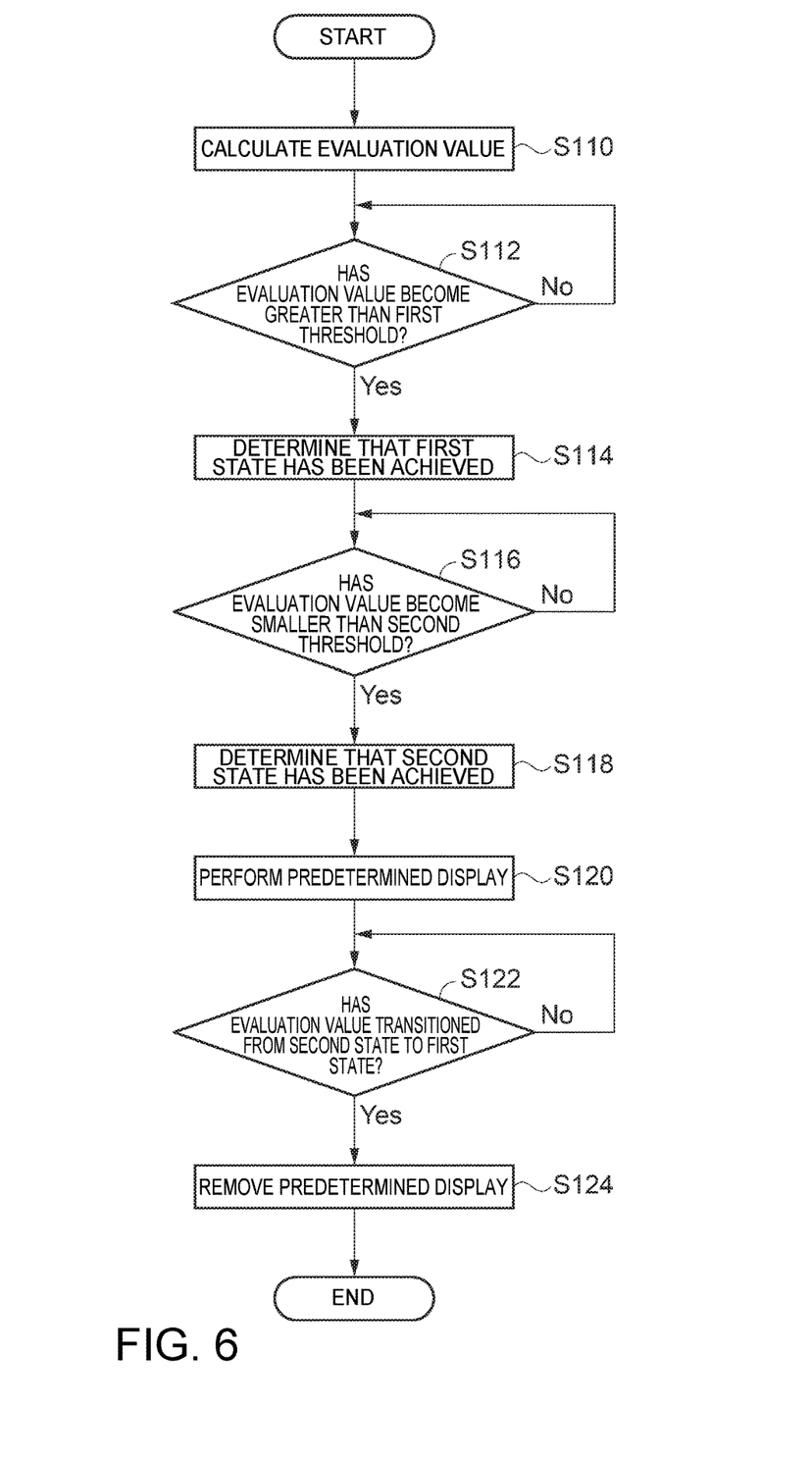
FIG. 6 is a flowchart showing Variation 1 of the display method.
Figure 7:
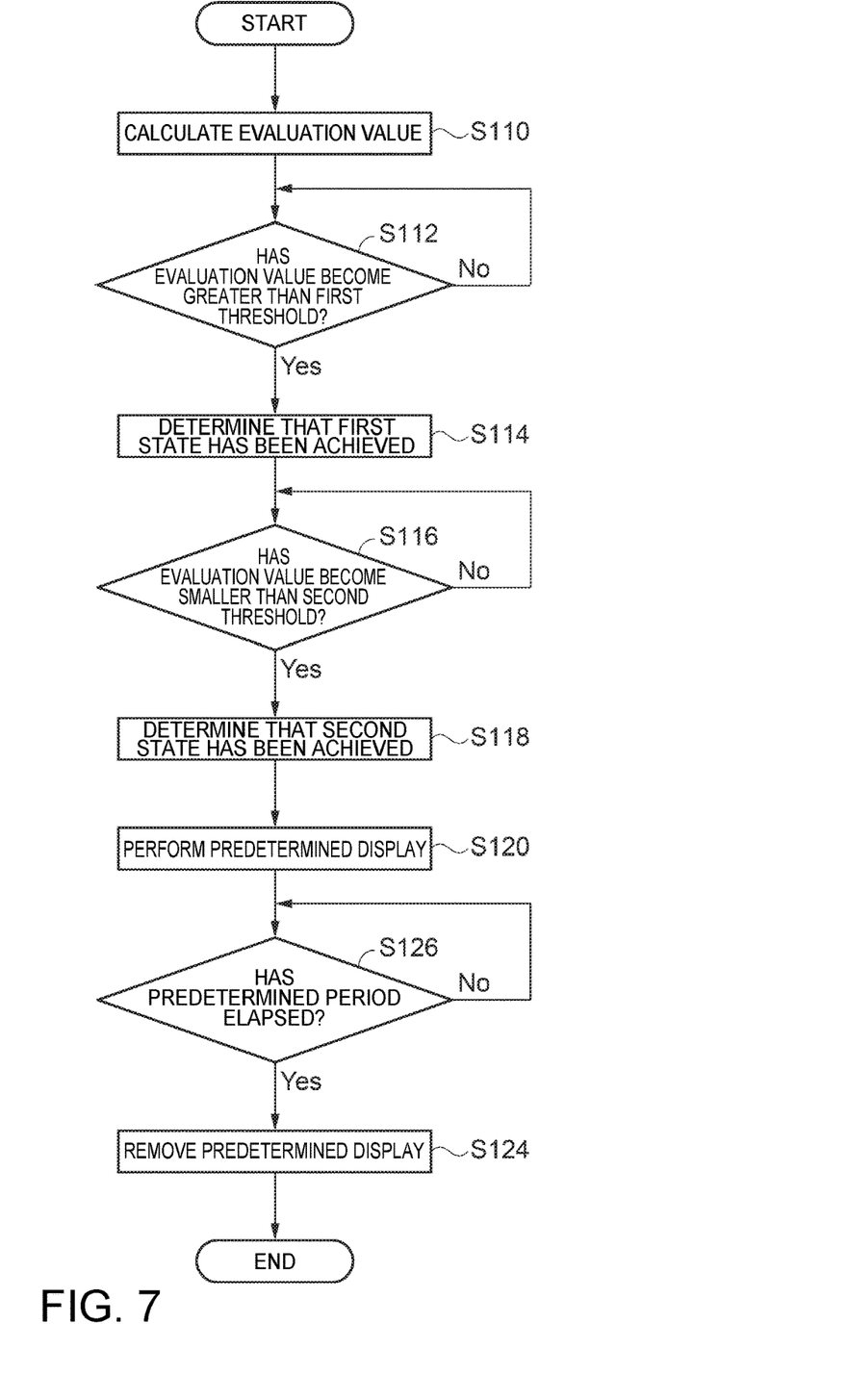
FIG. 7 is a flowchart showing Variation 2 of the display method.
Figure 8:
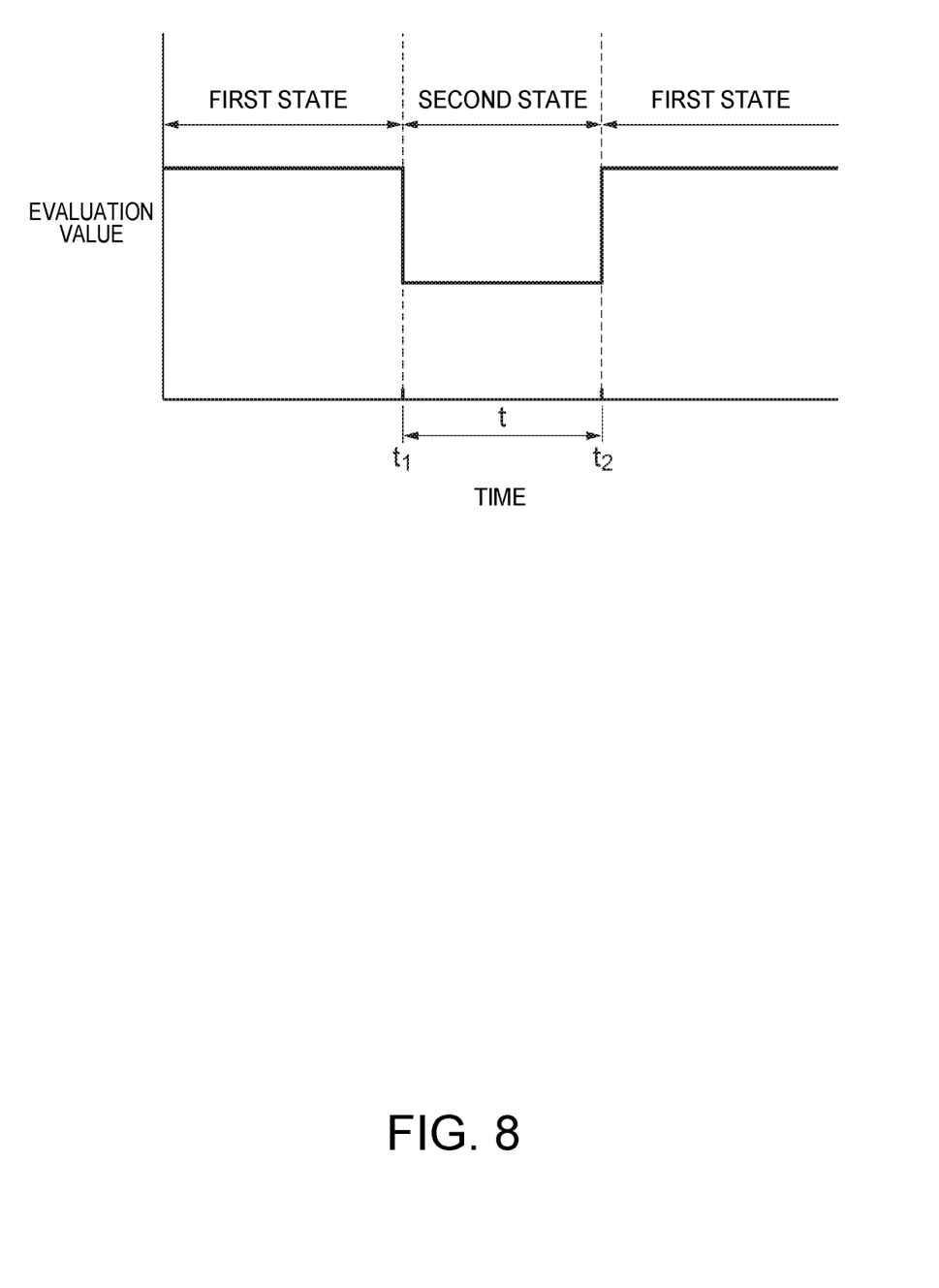
FIG. 8 is a timing chart for describing the timing when a predetermined display is removed.

Variations of the display system using the wrist apparatus 200 and the procedure of actions of the display system (display method) will be described as the procedure of the actions of the display system with reference to FIGS. 6, 7, and 8. FIG. 6 is a flowchart showing variation 1 of the display method. FIG. 7 is a flowchart showing variation 2 of the display method. FIG. 8 is a timing chart for describing the timing when the predetermined display is removed. The description will be made by assigning the same reference characters to the same configurations as the configurations and forms of the wrist apparatus 200 described above.

4.1. Procedure of Actions of Display System According to Variation 1 (Display Method)

Variation 1 of the display method using the display system includes, in addition to the action procedure (display method) in Example described with reference to FIG. 5 and after step S120 of performing the predetermined display, step S122 of evaluating whether or not the evaluation value has transitioned from the second state to the first state and step S124 of removing the predetermined display when it is determined that the evaluation value has transitioned from the second state to the first state, as shown in FIG. 6.

The procedure of the actions will be described below on a step basis in accordance with the flowchart of FIG. 6. The first and second thresholds are each set at a predetermined value in advance. The procedure in Variation 1 of the display method also includes the same steps S110, S112, S114, S116, S118, and S120 as those in Example described above before step S122, but the same steps will not be described below in detail.

The wrist apparatus 200 first undergoes step S110 of calculating the evaluation value, assuming that in the case where a result of evaluation of whether or not the evaluation value has become greater than the first threshold (step S112) shows that the evaluation value has become greater than the first threshold, it is determined that the first state has been achieved (step S114), and that in the case where a result of evaluation of whether or not the evaluation value has become smaller than the second threshold (step S116) shows that the evaluation value has become smaller than the second threshold, it is determined that the second state has been achieved (step S118), and step S120 of performing the predetermined display when a result of the evaluation shows that the first state has transitioned to the second state and performs the predetermined display on the display panel 55 of the display section 150 (step S120).

The evaluation section 46 then evaluates whether or not the evaluation value (combined power) has transitioned from the second state, in which the evaluation value is smaller than the second threshold, to the first state, in which the evaluation value is greater than the first threshold (step S122).

Thereafter, in a case where the evaluation section 46 determines in step S122 that the evaluation value has transitioned to the first state, in which the evaluation value is greater than the first threshold (Yes in step S122), the evaluation section 46 removes the predetermined display in the display section 150 (step S124) and switches the predetermined display to the normal display, which is a display in the arm swing state. In a case where the evaluation value remains in the second state, in which the evaluation value is smaller than the second threshold (No in step S122), the evaluation section 46 repeats the evaluation in step S122.

The removal of the predetermined display in step S124 is the end of the series of action of the display system according Variation 1 using the wrist apparatus 200 and the procedure of the actions of the display system (display method).

According to the display system of Variation 1 using the wrist apparatus 200 and the procedure of the actions of the display system (display method) described above, in addition to the effect provided by Example described above, the predetermined display in the viewing state can be automatically switched to the normal display, which is the display in the arm swing state, at the timing when the second state transitions to the first state as the switching timing. Since the display is automatically switched, a state in which a large amount of current is consumed, for example, the state in which the backlight 56 illuminates, is allowed to last for a short period, whereby consumption of the secondary battery or any other power supply can be reduced.

4.2. Procedure of Actions of Display System According to Variation 2 (Display Method)

Variation 2 of the display method using the display system includes, in addition to the action procedure (display method) in Example described with reference to FIG. 5 and after step S120 of performing the predetermined display, step S126 of evaluating whether or not a predetermined period t (see FIG. 8) has elapsed since timing $t_1$ (see FIG. 8) when the evaluation value has transitioned to the second state and step S124 of removing the predetermined display in a case where it is determined that the predetermined period t (see FIG. 8) has elapsed since the timing $t_1$ (see FIG. 8) when the evaluation value has transitioned to the second state, as shown in FIG. 7.

The procedure of the actions will be described below on a step basis in accordance with the flowchart of FIG. 7 and the timing chart of FIG. 8. The first and second thresholds and the predetermined period t (see FIG. 8) measured from the timing when the evaluation value transitions to the second state are each set at a predetermined value in advance. The procedure in Variation 2 of the display method also includes, before step S126, the same steps S110, S112, S114, S116, S118, and S120 as those in Example described above, but the same steps will not be described below in detail.

The wrist apparatus 200 first undergoes step S110 of calculating the evaluation value, assuming that in the case where a result of evaluation of whether or not the evaluation value has become greater than the first threshold (step S112) shows that the evaluation value has become greater than the first threshold, it is determined that the first state has been achieved (step S114), and that in the case where a result of evaluation of whether or not the evaluation value has become smaller than the second threshold (step S116) shows that the evaluation value has become smaller than the second threshold, it is determined that the second state has been achieved (step S118), and step S120 of performing the predetermined display when a result of the evaluation shows that the first state has transitioned to the second state and performs the predetermined display on the display panel 55 of the display section 150 (step S120).

The evaluation section 46 then evaluates whether or not the period having elapsed since the timing $t_1$ when the evaluation value (combined power P1) transitioned to the second state, in which the evaluation value is smaller than the second threshold, has reached the predetermined period t set in advance (step S126).

In a case where the evaluation section 46 determines in step S126 that the predetermined period t has elapsed since the timing $t_1$ when the evaluation value transitioned from the first state to the second state, in which the evaluation value is smaller than the second threshold, in other words, in the case where the evaluation section 46 determines in step S126 that the period having elapsed since the timing when the first state transitioned to the second state has reached the predetermined period t set in advance (Yes in step S126), the predetermined display in the display section 150 is removed (step S124) on the basis of timing $t_2$ when the elapsed period has reached the predetermined period t and switched to the normal display, which is the display in the arm swing state. In a case where the evaluation section 46 determines that the period having elapsed since the evaluation value transitioned to the second state, in which the evaluation value is smaller than the second threshold, has not reached the predetermined period t set in advance (No in step S126), the evaluation section 46 repeats the evaluation in step S126.

The removal of the predetermined display in step S124 is the end of the series of actions of the display system according Variation 2 using the wrist apparatus 200 and the procedure of the actions of the display system (display method).

According to the display system of Variation 2 using the wrist apparatus 200 and the procedure of the actions of the display system (display method) described above, in addition to the effect provided by Example described above, the predetermined display in the viewing state can be automatically switched to the normal display, which is the display in the arm swing state, on the basis of the timing $t_2$ when the period having elapsed since the timing $t_1$ when the first state transitioned to the second state has reached the predetermined period t set in advance. Since the display is automatically switched, a state in which a large amount of current is consumed, for example, the state in which the backlight 56 illuminates, is allowed to last for a short period, whereby consumption of the secondary battery or any other power supply can be reduced.

Further, in the above description, the wrist apparatus 200 worn around the user's wrist has been described by way of example of the portable electronic apparatus. Instead, the following examples showing how the user wears the wrist apparatus can be presented: For example, the portable electronic apparatus may be a neckless-shaped apparatus worn around the neck; may be worn, for example, on the torso or around an ankle; or may be held in the user's pocket or bag, as in the case of a personal digital assistance.

Further, in the above description, the wrist apparatus 200 is configured to include the body motion sensor section 170 as a sensor by way of example. Instead, the sensor can, for example, be a biological sensor (optical sensor) that detects information on the user's body, such as the pulse and pulse wave (biological information), an atmospheric pressure sensor (altitude sensor), a magnetic sensor, and a variety of other sensors.

In the above description, the predetermined display performed in the case where it is determined that the second state has been achieved when the evaluation value becomes smaller than the second threshold in the first state, that is, in the case where the evaluation value transitions from the first state to the second state is the action of turning on the backlight 56 byway of example, but not necessarily. Other examples of the predetermined display may include the action of changing a display pattern or increasing the size of displayed letters. Further, information set by the user in advance (such as lap time, running distance, running period, pace, consumed calorie, $VO_2$max, $SpO_2$ (endermic arterial oxygen saturation), and HRV (heart rate variability)) can also be displayed. Any display the visibility of which can be increased, such as those described above, can be displayed.

The above description has been made by using a GPS (Global Positioning System) as the satellite positioning system, and another global navigation satellite system (GNSS) may instead be used. For example, one of or two or more of EGNOS (European Geostationary-Satellite Navigation Overlay Service), QZSS (Quasi Zenith Satellite System), GLONASS (Global Navigation Satellite System), GALILEO, BeiDou (BeiDou Navigation Satellite System), and other satellite positioning systems may be used. Further, WAAS (Wide Area Augmentation System), EGNOS (European Geostationary-Satellite Navigation Overlay Service), or any other satellite-based augmentation system (SBAS) may be used as at least one of the global navigation satellite systems.

The entire disclosure of Japanese Patent Application No. 2016-217820 filed Nov. 8, 2016 is expressly incorporated by reference herein.

What is claimed is:

1. A display method comprising:
   determining, by a processor, that a motion of an arm of a user is a swinging motion during an activity performed by the user by comparing a first threshold with a first evaluation value that is calculated according to a preset formula using a first magnitude of acceleration along a first axis, a second magnitude of acceleration along a second axis, and a third magnitude of acceleration along a third axis, the first, second and third magnitudes being outputted from a tri-axial acceleration sensor at a first time during the activity;
   determining, by the processor, the motion of the arm switching to a viewing motion from the swinging motion during the activity by comparing a second threshold with a second evaluation value calculated according to the preset formula using the first, second and third magnitudes outputted from the tri-axial acceleration sensor at a second time after determining the swinging motion during the activity;

turning on a backlight of a display, by the processor, in response to the motion of the arm switching to the viewing motion from the swinging motion during the activity; and turning off the backlight of the display, by the processor, when a predetermined period elapses from the turning on of the backlight of the display during the activity.

2. The display method according to claim 1, wherein the second threshold is smaller than the first threshold.

3. The display method according to claim 1, wherein:
the processor determines the motion of the arm switching to the swinging motion from the viewing motion during the activity by comparing the first threshold with a third evaluation value calculated using the first, second and third magnitudes outputted from the tri-axial acceleration sensor at a third time after determining the viewing motion during the activity; and
the processor turns off the backlight of the display in response to the motion of the arm switching to the swinging motion from the viewing motion during the activity.

4. The display method according to claim 1, wherein the processor calculates the first evaluation value and the second evaluation value by combining the first, second and third magnitudes outputted from the tri-axial acceleration sensor.

5. The display method according to claim 1, wherein the first evaluation value and the second evaluation value are each calculated in a form of a combined power which is a combination of outputs representing acceleration along three axes.

6. A portable electronic apparatus comprising:
a tri-axial acceleration sensor; and
a processor programmed to:
determine that a motion of an arm of a user is a swinging motion during an activity performed by the user by comparing a first threshold with a first evaluation value that is calculated according to a preset formula using a first magnitude of acceleration along a first axis, a second magnitude of acceleration along a second axis, and a third magnitude of acceleration along a third axis, the first, second and third magnitudes being outputted from the tri-axial acceleration sensor at a first time during the activity;
determine the motion of the arm switching to a viewing motion from the swinging motion during the activity by comparing a second threshold with a second evaluation value calculated according to the preset formula using the first, second and third magnitudes outputted from the tri-axial acceleration sensor at a second time after determining the swinging motion during the activity;
turn on a backlight of a display in response to the motion of the arm switching to the viewing motion from the swinging motion during the activity; and
turn off the backlight of the display when a predetermined period elapses from the turning on of the backlight of the display during the activity.

7. The portable electronic apparatus according to claim 6, wherein
the second threshold is smaller than the first threshold.

8. The portable electronic apparatus according to claim 6, wherein the processor is programmed to:
determine the motion of the arm switching to the swinging motion from the viewing motion during the activity by comparing the first threshold with a third evaluation value calculated using the first, second and third magnitudes outputted from the tri-axial acceleration sensor at a third time after determining the viewing motion during the activity; and
turn off the backlight of the display in response to the motion of the arm switching to the swinging motion from the viewing motion during the activity.

9. The portable electronic apparatus according to claim 6, wherein the processor is programmed to:
calculate the first evaluation value and the second evaluation value by combining the first, second and third magnitudes outputted from the tri-axial acceleration sensor.

10. The portable electronic apparatus according to claim 6, further comprising:
at least one of an angular velocity sensor and a magnetic sensor.

11. The portable electronic apparatus according to claim 6, wherein
the first evaluation value and the second evaluation value are each calculated in a form of a combined power which is a combination of outputs representing acceleration along three axes.

12. A non-transitory storage medium that stores a program that causes a computer to execute:
determining that a motion of an arm of a user is a swinging motion during an activity performed by the user by comparing a first threshold with a first evaluation value that is calculated according to a preset formula using a first magnitude of acceleration along a first axis, a second magnitude of acceleration along a second axis, and a third magnitude of acceleration along a third axis, the first, second and third magnitudes being outputted from a tri-axial acceleration sensor at a first time during the activity;
determining the motion of the arm switching to a viewing motion from the swinging motion during the activity by comparing a second threshold with a second evaluation value calculated according to the preset formula using the first, second and third magnitudes outputted from the tri-axial acceleration sensor at a second time after determining the swinging motion during the activity;
turning on a backlight of a display in response to the motion of the arm switching to the viewing motion from the swinging motion during the activity; and
turning off the backlight of the display when a predetermined period elapses from the turning on of the backlight of the display during the activity.

13. The non-transitory storage medium according to claim 12, wherein
the second threshold is smaller than the first threshold.

14. The non-transitory storage medium according to claim 12, wherein the program causes the computer to execute:
determining the motion of the arm switching to the swinging motion from the viewing motion during the activity by comparing the first threshold with a third evaluation value calculated using the first, second and third magnitudes outputted from the tri-axial acceleration sensor at a third time after determining the viewing motion during the activity; and
turning off the backlight of the display in response to the motion of the arm switching to the swinging motion from the viewing motion during the activity.

15. The non-transitory storage medium according to claim 12, wherein the first evaluation value and the second evaluation value are each calculated in a form of a combined power which is a combination of outputs representing acceleration along three axes.

* * * * *